(12) United States Patent
Fillipo et al.

(10) Patent No.: US 9,249,280 B2
(45) Date of Patent: Feb. 2, 2016

(54) VISCOSITY SUPPRESSION OF ASSOCIATIVE THICKENERS USING ORGANOPHOSPHATES

(71) Applicant: Hercules Incorporated, Wilmington (DE)

(72) Inventors: Bruce K. Fillipo, Springfield, PA (US); Tuyen T. Nguyen, Newark (DE); Arjun C. Sau, Newark (DE)

(73) Assignee: HERCULES INCORPORATED, Wilmington, DE (US)

( * ) Notice: Subject to any disclaimer, the term of this patent is extended or adjusted under 35 U.S.C. 154(b) by 88 days.

(21) Appl. No.: 13/788,500

(22) Filed: Mar. 7, 2013

(65) Prior Publication Data

US 2013/0237651 A1    Sep. 12, 2013

Related U.S. Application Data

(60) Provisional application No. 61/608,240, filed on Mar. 8, 2012.

(51) Int. Cl.
*C08K 5/521* (2006.01)
*C09D 7/00* (2006.01)
*C09D 5/02* (2006.01)

(52) U.S. Cl.
CPC ............. *C08K 5/521* (2013.01); *C09D 5/024* (2013.01); *C09D 7/002* (2013.01)

(58) Field of Classification Search
CPC ............................... C08K 5/521; C09D 7/002
USPC ............................................................ 524/115
See application file for complete search history.

(56) References Cited

U.S. PATENT DOCUMENTS

| 4,079,028 A | 3/1978 | Emmons et al. |
| 4,155,892 A | 5/1979 | Emmons et al. |
| 4,327,008 A | 4/1982 | Schimmel et al. |
| 4,374,937 A * | 2/1983 | Nemcek et al. ................ 522/76 |
| 4,426,485 A | 1/1984 | Hoy et al. |
| 4,428,860 A * | 1/1984 | Panek et al. ..................... 516/9 |
| 4,496,708 A | 1/1985 | Dehm et al. |
| 4,499,233 A | 2/1985 | Tetenbaum et al. |
| 5,137,571 A | 8/1992 | Eisenhart et al. |
| 5,281,654 A | 1/1994 | Eisenhart et al. |
| 5,376,709 A | 12/1994 | Lau et al. |
| 5,425,806 A | 6/1995 | Doolan et al. |
| 5,574,127 A | 11/1996 | Sau |
| 5,627,232 A | 5/1997 | Glancy et al. |
| 5,629,373 A | 5/1997 | Glancy et al. |
| 5,914,373 A | 6/1999 | Glancy et al. |
| 5,916,935 A | 6/1999 | Wiggins et al. |
| 6,020,407 A | 2/2000 | Campbell et al. |
| 6,057,398 A | 5/2000 | Blum |
| 6,150,445 A | 11/2000 | Bostrom et al. |
| 6,162,877 A | 12/2000 | Sau |
| 6,809,132 B2 | 10/2004 | Sau |
| 6,900,255 B2 | 5/2005 | Sau |
| 7,741,402 B2 | 6/2010 | Bobsein et al. |
| 2006/0128846 A1 | 6/2006 | Bakeev et al. |
| 2008/0108775 A1* | 5/2008 | Schieferstein et al. ......... 528/66 |
| 2011/0189487 A1* | 8/2011 | Zacharias et al. ............ 428/413 |

FOREIGN PATENT DOCUMENTS

| EP | 0498442 | 12/1992 |
| WO | 0112712 | 2/2001 |

OTHER PUBLICATIONS

International Search Report, PCT/US2013029582, May 7, 2013, pp. 2.

* cited by examiner

*Primary Examiner* — Ling Choi
*Assistant Examiner* — Lanee Reuther
(74) *Attorney, Agent, or Firm* — Dunlap Codding, P.C.; Shaorong Chen

(57) ABSTRACT

The viscosity of solutions of nonionic synthetic associative thickeners is controlled by adding organophosphates to the solution of associative thickeners. The associative thickeners are hydrophobically modified polymers and the organophosphates include one or more hydrophobic groups.

14 Claims, No Drawings

VISCOSITY SUPPRESSION OF ASSOCIATIVE THICKENERS USING ORGANOPHOSPHATES

CROSS REFERENCE TO RELATED APPLICATIONS

The present application claims the benefit under 35 U.S.C. 119 (e) of U.S. Provisional Patent Application Ser. No. 61/608,240, filed Mar. 8, 2012, the entire content of which is hereby expressly incorporated herein by reference.

BACKGROUND OF THE INVENTION

1. Field of the Disclosed and Claimed Inventive Concepts

The presently disclosed and claimed inventive concept(s) relates to an associative thickener composition used to control the solution viscosity and other rheological properties of associative thickeners in aqueous media. More particularly, the associative thickener composition comprises a water dispersible polymer modified with a first hydrophobic group and a low VOC organophosphate, and is used to control the viscosity of high solids solutions of nonionic synthetic associative thickeners.

2. Background and Applicable Aspects of the Presently Disclosed and Claimed Inventive Concept(s)

Associative thickeners (ATs) have become rheology modifiers of choice to control the rheology of various aqueous based systems. Notably, their use to control the rheology of water-borne coatings continues to grow. They can be added to control the viscosity of the coatings during their manufacture as well as during applications. They can particularly be used to achieve several desirable application properties including spatter control, sag resistance, and good flow and leveling. In addition, good film build and development of full gloss potential after the coatings dry are highly desirable to achieve good hiding and appearance of the dried film respectively. ATs are water-soluble polymers modified with a small amount of hydrophobic groups. They can associate among themselves through their grafted hydrophobes as well as with other hydrophobic components present in a water-borne coating formulation leading to the development of a three-dimensional network.

Currently, there are three classes of commercial ATs available in the market place. These are: (a) hydrophobically modified hydroxyethylcelluloses (HM-HECs), (b) hydrophobically modified nonionic synthetic polymers, and (c) hydrophobically modified polyacrylates. In many water-borne systems, hydrophobically modified nonionic synthetic polymers are preferred over HM-HECs or hydrophobically modified polyacrylates as they can provide several desirable properties not offered by the latter.

In the last three decades, hydrophobically modified nonionic synthetic polymers have gained significant commercial importance. They are colloquially referred to in the market place as nonionic synthetic associative thickeners (NSATs).

Rapid incorporation of NSATs in the solid form into water-borne systems is very difficult. Currently NSATs are sold in the liquid form by dissolving the polymer in water containing 10-40% of the polymer. Since certain NSATs build up significant viscosity (>1000 cps) even at >2 wt % concentrations, the delivery of high-solids (>2 wt %) solutions of NSATs which are easily pourable, drainable under gravity or pumpable is challenging. To mitigate this problem, additives can be used to lower the solution viscosity of high-solids (>10 wt %) solutions of NSATs. Since they suppress the solution viscosity of NSATs, they are often referred to as "viscosity suppressants".

While organic solvents (e.g., butyl Carbitol®, ethylene glycol and propylene glycol) and co-solvents can effectively suppress the solution viscosity of NSATs, their use has been recently discouraged as they are volatile. During the manufacture of coatings as well as during the drying of coatings, the volatile organic compounds (VOCs) present in coatings are released to the environment. Consequently, they pose a potentially serious environmental hazard and human health risks during the manufacture as well as after they are applied. They can also negatively impact the rheological performance of NSATs in an intended application. Due to enforcements of strict governmental regulations to control the emission of VOCs, the coatings industry is under pressure to comply with government regulations on VOCs. Their goal is to eliminate or significantly lower the amounts of VOCs in coatings and comply with local regulations. Therefore, there is drive to do away with VOCs in raw materials and formulations ingredients used to formulate water-borne coatings.

To suppress solution viscosity of NSATs, another approach is described in U.S. Pat. Nos. 5,137,571 and 5,376,709 that disclose the use of cyclodextrins or their derivatives to suppress the solution viscosity of hydrophobically modified ethoxylated polyurethanes, hydrophobically modified alkali-soluble emulsions, hydrophobically modified hydroxyethylcellulose, or hydrophobically modified polyacrylamides. The use of cyclodextrins to suppress the solution viscosity of hydrophobically modified poly(acetal-polyethers) and other non-urethane NSATs is described in U.S. Pat. No. 6,809,132 and U.S. Pat. No. 6,900,255 respectively. While cyclodextrins are non-volatile, they are expensive and may not efficaciously suppress the solution viscosity of NSATs bearing certain types of "complex" hydrophobes.

U.S. Pat. Nos. 5,916,935 and 6,057,398 describe the preparation of a concentrated solution of thickeners by forming an admixture of a non-urethane associative thickener compound and surfactants in conjunction with water and an organic solvent and subsequently azeotropically distilling off the organic solvent. The associative thickener solution thus obtained is typically essentially free of VOCs.

The use of surfactants to suppress the solution viscosity of NSATs is described in U.S. Pat. Nos. 5,425,806, 6,020,407 and U.S. Pat. No. 6,150,445. However, if a nonionic surfactant used for viscosity suppression of NSATs has low molecular weight it can contribute to VOC. Examples of such surfactants can include, but are not limited to, ethylene oxide adducts of low carbon chain fatty alcohol (<C10 carbon alcohol) with fewer (<4) alkylene oxide units.

Since even low VOC levels present in raw materials used to formulate the coatings can have a significant contribution to the total VOCs of the final coatings formulation, coating formulators have a preference for raw materials with very low or no VOCs.

The use of an acid to suppress the solution viscosity of hydrophobically modified ethylene oxide urethane (HEUR) polymers bearing aminated hydrophobes is disclosed in U.S. Pat. No. 7,741,402. By treating the aqueous solutions of the aminated polymers with an acid, the nitrogen centers of the aminated hydrophobes are quaternized. In other words, a cationic polymer is formed in solution. Due to quaternization of the nitrogen centers of the aminated hydrophobes, they repel each other and cannot undergo inter-chain hydrophobic associations to build high solution viscosity under acidic environment. When the acidified polymer solutions of these polymers are added to an aqueous media with alkaline pH (pH>7), the quaternized nitrogen centers revert to a certain degree to the neutral amine form and occasion hydrophophobic association leading to enhanced solution viscosity. The degree of this reversal of the quaternary nitrogen centers to the amine form would depend upon the pH of the aqueous media where it is being used. The drawback of this system is that the high solid solutions of the aminated polymer cannot be delivered using acids.

In addition, quaternization of the nitrogen centers in the aminated polymers could promote interactions with anionic species present in the aqueous media leading to insolubilization or inefficient viscosification of the system. Because of these, the use of aminated polymers delivered using an acid is somewhat restricted.

There is a need to design alternative viscosity suppressants that would efficiently lower the solution viscosity of NSATs and yet would be devoid of the deficiencies of currently used viscosity suppressants, viz., nonionic organic surfactants, cyclodextrins and acids.

DETAILED DESCRIPTION

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed and claimed inventive concept(s) shall have the meanings that are commonly understood by those of ordinary skill in the art. Further, unless otherwise required by context, singular terms shall include pluralities and plural terms shall include the singular. Generally, nomenclatures utilized in connection with, and techniques of chemistry described herein are those well known and commonly used in the art. Reactions and purification techniques are performed according to manufacturer's specifications or as commonly accomplished in the art or as described herein. The nomenclatures utilized in connection with, and the laboratory procedures and techniques of, analytical chemistry, synthetic organic chemistry, and medicinal and pharmaceutical chemistry described herein are those well known and commonly used in the art. Standard techniques are used for chemical syntheses, chemical analysis, pharmaceutical preparation, formulation, and delivery, and treatment of patients.

All patents, published patent applications, and non-patent publications mentioned in the specification are indicative of the level of skill of those skilled in the art to which this presently disclosed and claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, and/or the variation that exists among the study subjects. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

The presently disclosed and claimed inventive concept(s) relates to an associative thickener composition comprising a water dispersible polymer modified with a first hydrophobic group and a low VOC organophosphate. The organophosphate can be represented by one or both of the following formulas:

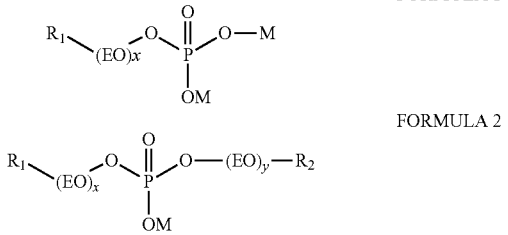

FORMULA 1

FORMULA 2 wherein M represents a counter cation, x and y are 0-12, and wherein $R_1$ or $R_2$ is the same as the first hydrophobic group; or $R_1$ or $R_2$ is a second hydrophobic group with 19 or less carbon atoms.

The organophosphate can be mono-substituted, as shown in Formula 1. The organophosphate can also be di-substituted (same hydrophobe) or co-substituted (two different hydrophobes), as represented by Formula 2. The organophosphate can be a combination of Formula 1 and Formula 2.

The water dispersible polymer modified with the first hydrophobic group can be a hydrophobically modified nonionic synthetic polymer, also known as a nonionic synthetic associative thickener (NSAT).

These NSATs can be water-soluble or -dispersible. Hereinafter, unless specified otherwise, water-dispersible is intended to also refer to water-soluble. As indicated, these NSATs can include, but are not limited to, hydrophobically modified ethylene oxide urethane (HEUR) block copolymers, aminated HEURs, hydrophobically modified poly(acetal polyethers) (HM-PAPEs), hydrophobically modified aminoplast polyethers, hydrophobically modified polyacrylates and polymethacrylates (HM-PA and HM-PMA), as well as hydrophobically modified polysaccharides such as hydroxyethyl cellulose.

Among commercial nonionic synthetic associative thickeners, hydrophobically modified ethylene oxide urethane (HEUR) block copolymers constitute an important class. They are disclosed in U.S. Pat. Nos. 4,079,028, 4,155,892, and 5,281,654, the disclosures of which are herein incorporated by references. These are low molecular weight polyurethanes made by condensing relatively low molecular weight polyethylene glycol (e.g. molecular weight ~10,000) with hydrophobic diisocyanates and end-capping with hydrophobic alcohols or amines. HEUR thickeners can be characterized by having three or more hydrophobe groups—two of which are terminal and the remainders are internal. The hydrophobic groups can be connected to the hydrophilic polyethylene oxide blocks through urethane linkages. Aminated HEUR polymers bearing aminated hydrophobes are disclosed in U.S. Pat. No. 7,741,402, the disclosure of which is herein incorporated by reference. When aminated HEUR polymers are treated with an acid to pH<7, the nitrogen contents of the aminated hydrophobes are quaternized.

The preparation of water dispersible HEURs is disclosed in U.S. Pat. Nos. 4,499,233 and 5,023,309, the disclosures of which are herein incorporated by references. These HEURs are claimed to provide thickening in aqueous paints and coating systems.

Processes for the production of HEURs with pendant hydrophobes in bunches are described in U.S. Pat. Nos. 4,426,485 and 4,496,708, the disclosures of which are herein incorporated by references. These HEURs are believed to provide enhanced thickening to aqueous systems through micelle-like association.

HEURs with branched structure and terminal hydrophobes are disclosed in U.S. Pat. No. 4,327,008, the disclosure of which is herein incorporated by reference. They are made by reacting polyalkylene oxides with a polyfunctional material, a diisocyanate and water and end-capping the resulting product with a hydrophobic monofunctional active hydrogen-containing compound or a monoisocyanate.

Silicon-containing HEURs having particular utility in paints and coatings are disclosed in European Patent Application No. 0498,442 A1, the disclosure of which is herein incorporated by reference. These are reaction products of isocyanate functional material, a polyether polyol, a monofunctional active hydrogen containing hydrophobic compound, a silane-functional material, and water.

Comb type polyurethane thickeners are described in U.S. Pat. No. 5,496,908, the disclosure of which is herein incorporated by reference. These polymers have moderate viscosities in aqueous solution and are useful as thickeners for alkyd- or latex-based paints. Also reported are synthesis and viscoelastic properties of comb type polyurethane thickeners (Xu, B. et al., Langmuir, 1997, 13, 6896; Xu, B. et al, Langmuir, 1997, 13, 6903, the disclosure of which is herein incorporated by reference.

U.S. Pat. No. 5,574,127 discloses associative thickeners which are water soluble and dispersible polymer compositions that have a backbone of poly(acetal- or ketal-polyether) with ends that are capped with hydrophobic groups (HM-PAPE). They are prepared by copolymerizing an alpha, omega-diol, -dithiol or -diamino polyether with a gem-dihalide compound in the presence of a base to form an alpha, omega-diol, -dithiol or -diamino poly(acetal- or ketal-polyether) which in turn is reacted with hydrophobic reagents to form the final product. These associative thickeners are used in film forming coating compositions, such as latex paints.

The hydrophobically modified comb polymers also have poly(acetal- or ketal-polyether) backbone with pendant hydrophobes. These comb polymers can be prepared by copolymerizing 1) water-soluble polymers bearing alpha, omega-active hydrogen, 2) hydrophobic compounds having alpha, omega-active hydrogen atoms or their alkoxylated derivatives, and 3) dihalogeno compounds or their derivatives in the presence of a base for a sufficient time. Additionally, the ends of these polymers are capped with hydrophobes. As in the HM-PAPE, the hydrophobe carbon chain length of the comb HM-PAPE polymers of this presently disclosed and claimed inventive concept(s) has a lower limit of 8 carbons. In one non-limiting embodiment, the lower limit is about 10 carbons. In another non-limiting embodiment, the lower limit is about 12 carbons. The upper limit of the hydrophobe carbon chain length is generally 40 carbons. In one non-limiting embodiment, the upper limit is about 20 carbons. In another non-limiting embodiment, the upper limit is about 18 carbons.

The HM-PAPEs and comb HM-PAPEs are described in more detail in U.S. Pat. Nos. 5,574,127 and 6,162,877, respectively, the disclosures of which are herein incorporated by references.

The preparations of various hydrophobically modified aminoplast polyethers associated with the presently disclosed and claimed inventive concept(s) are described in U.S. Pat. Nos. 5,627,232, 5,629,373, 5,914,373 and WO 01/12712, and their disclosures are herein incorporated by references.

According to descriptions in U.S. Pat. Nos. 5,629,373, and 5,914,373, the disclosures of which are herein incorporated by references, aminoplast-polyether copolymers can be made by condensation reaction of a polyfunctional aminoplast with a bifunctional polyether in the presence of an acid catalyst.

Aminoplast reagents are condensation products of an aldehyde (formaldehyde) with amines, such as melamines, ureas, benzoguanamines, and glycolurils. The hydrophobes are incorporated into the copolymer backbone by co-reacting the bifunctional polyether and an ethoxylated alkyl/aryl phenol with the aminoplast.

A hydrophobe can be used to modify a water dispersible polymer. In the presently disclosed and claimed inventive concept(s), a first hydrophobic group can be used to modify a NSAT. The first hydrophobic group can be a hydrophobic moiety selected from the group consisting of linear alkyl, branched alkyl, alkenyl, alkylaryl, arylalkyl, arylalkenyl, cycloaliphatic, polycyclic, and combinations thereof. Generally the first hydrophobe has at least one carbon atom, preferably at least six carbon atoms. Practically, the first hydrophobe can have up to 19 carbon atoms. In one non-limiting embodiment, the first hydrophobic group can be a $C_5$-$C_{19}$ alkyl. In another non-limiting embodiment, the first hydrophobic group can be a $C_8$-$C_{19}$ alkyl. The first hydrophobic group can also be a branched alkyl. In one non-limiting embodiment, the first hydrophobic group is 2-ethylhexyl.

In Formula 2, $R_2$ can be the same as or different from $R_1$. In one non-limiting embodiment, $R_1$ or $R_2$ can be the same as the first hydrophobic group on the NSAT. If the first hydrophobe on the NSAT is a branched alkyl, $R_1$ can also be a branched alkyl. In one non-limiting embodiment, $R_1$ can be the same branched alkyl ±1 or 2 carbon atoms as the first hydrophobe. Generally, these R groups can be $C_5$-$C_{19}$ linear alkyl or branched alkyl groups.

$R_1$ and $R_2$ can be a second hydrophobic group with 19 or less carbon atoms. The second hydrophobic group can be linear alkyl, branched alkyl, alkenyl, aryl, alkylaryl, arylalkyl, arylalkenyl cycloaliphatic, polycyclic or complex moieties.

As an example, a co-substitution or co-ester (Formula 2) can be utilized, wherein $R_1$ is a lower carbon chain alkyl such as $C_8$ (x=0), and $R_2$ is a higher carbon chain alkyl such as $C_{18}$ and y is 6-9. The oligomeric ethylene oxide spacers can reduce the hydrophobicity and increase the water solubility of the organophosphate. With co-esters (Formula 2), $R_1$ can specify a lower carbon chain (fewer carbon atoms) relative to $R_2$ and y can be greater than x to offset the hydrophobicity of $R_2$.

It was surprising to find that the solution viscosity of NSATs whose solution viscosity cannot be efficiently suppressed using traditional viscosity suppressants, such as non-ionic surfactants, cyclodextrins or acids can be suppressed using organophosphates. Low VOC organophosphates have been found to be effective not only in depressing NSAT viscosity but also in controlling NSAT viscosity. Further, most efficient viscosity control can be achieved when the organophosphate bears the same or chemically similar hydrophobes as the NSAT has. More specifically, these NSATs bear bulky hydrophobes on the backbone as pendant groups or at the ends of the polymer chains. The bulky hydrophobes may be comprised of several low molecular weight hydrophobes covalently connected by short hydrophobes or connecting groups. The associative thickener composition of the presently disclosed and claimed inventive concept(s) can be used to reduce viscosity of aqueous solutions or dispersions of NSATs.

Another embodiment of the presently disclosed and claimed inventive concept(s) is to suppress the solution viscosity of NSATs using organophosphates that contain alkoxylated spacer between the phosphorus center and the hydrophobe.

By low VOC we are referring to an organophosphate composition having less than 5000 ppm of VOC (EPA method 24). In one non-limiting embodiment, the VOC is than 1000 ppm. An effective amount of a subject organophosphate can be added to the concentrated NSAT solution to control (reduce) the viscosity. Generally, about 5 to 15% organophosphates can be added. In one non-limiting embodiment, about 5 to 10% organophosphates by active weight can be added.

Organophosphates can be produced as combinations of mono- and di-substituted organophosphates where processes can be adjusted to achieve specific levels of mono- and di-substitution.

Organophosphates for use in the presently disclosed and claimed inventive concept(s) can be prepared by phosphatizing alcohols or alcohol ethoxylates, such as 2-ethylhexyl alcohol or phosphatizing a blend of alcohols to produce co-esters such as 2-ethylhexyl alcohol, tri-decyl alcohol, and isooctyl alcohol/ethoxylated tri-decyl alcohol.

NSATs having a low VOC organophosphate of the presently disclosed and claimed inventive concept(s) can normally be added as concentrated aqueous solutions to, for example, but not by way of limitation, water-borne coatings and paint formulations. The concentrated solutions include about 3 to 35 percent of the NSAT solids by weight, generally 18 to 25% by weight. In order to easily utilize the thickeners, the viscosity of the concentrated solution can be controlled, and generally can be about 5000 cps or less and generally about 3000 or less.

The following examples illustrate the presently disclosed and claimed inventive concept(s), parts and percentages being by weight, unless otherwise indicated. Each example is provided by way of explanation of the presently disclosed and claimed inventive concept(s), not limitation of the presently disclosed and claimed inventive concept(s). In fact, it will be apparent to those skilled in the art that various modifications and variations can be made in the presently disclosed and claimed inventive concept(s) without departing from the scope or spirit of the invention. For instance, features illustrated or described as part of one embodiment, can be used on another embodiment to yield a still further embodiment. Thus, it is intended that the presently disclosed and claimed inventive concept(s) covers such modifications and variations as come within the scope of the appended claims and their equivalents.

EXAMPLE

Example 1

Synthesis of Organophosphates—Samples 1-4

The reactants used to synthesize organophosphates for Samples 1, 2, 3, and 4 are listed in Table 1.

TABLE 1

Synthesis of Organophosphate for Samples 1-4

| Sample | Stoichiometric Ratio | Component, wt % | | | | | |
|---|---|---|---|---|---|---|---|
| | | TDA-6 | TDA-9 | IOA (Exxal 8) | n-Octanol | $P_4O_{10}$ | Total |
| Sample 1 | IOA/TDA-6 (5:1) | 32.1 | | 45.1 | | 22.7 | 100 |
| Sample 2 | TDA-9/IOA (6:1) | | 33.9 | 44.3 | | 21.8 | 100 |

TABLE 1-continued

Synthesis of Organophosphate for Samples 1-4

| Sample | Stoichiometric Ratio | Component, wt % | | | | | |
|---|---|---|---|---|---|---|---|
| | | TDA-6 | TDA-9 | IOA (Exxal 8) | n-Octanol | $P_4O_{10}$ | Total |
| Sample 3 | IOA/FDA-6 (4:1) | 36.9 | | 41.4 | | 21.8 | 100 |
| Sample 4 | TDA-9/2-EH (1:1.3) | | 34.3 | | 45 | 20.6 | 100 |

IOA—Isooctyl alcohol
TDA-6—Ethoxylatedtridecyl alcohol with an average of 6 moles of ethylene oxide
TDA-9—Ethoxylatedtridecyl alcohol with an average of 9 moles of ethylene oxide
2-EH—2-ethylhexyl alcohol Alcohol and ethoxylated fatty alcohol listed in Table 1 for each sample were charged into a clean/dry baffled and jacketed stainless vessel equipped with a stirrer at room temperature under nitrogen atmosphere. The content of the vessel was heated to about 30° C. Then, tetraphosphorous decaoxide ($P_4O_{10}$) was added to the vessel. The reactant mixture was slowly heated to about 85 to 90° C. Then the temperature was increased to about 100° C. and held for about 2 hours with continuous stirring. After that, the temperature was decreased to about 60° C. Finally, 45% potassium hydroxide solution was added into the reaction mixture to neutralize the generated organophosphoric acid. The vessel was cooled down to about 25° C. and the final product was collected.

Example 2

Synthesis of Organophosphates—Sample 5

Into a 5 liter beaker, equipped with a stirrer were charged TDA-9 (872.5 g) and 2-ethyl hexanol (1142.5 g) at room temperature. The resulting mixture was mixed and under agitation was slowly added powder tetraphosphorus decaoxide ($P_4O_{10}$) (522.5 g). After addition of the tetraphosphorus decaoxide, the temperature of the reaction mixture was increased to about 105° C. The resulting mixture was mixed for 2 h and then it was maintained at 60° C. for 1 h. Following this, 45% potassium hydroxide solution (782 g) was added to the reaction mixture to adjust the pH of the mixture to about 4.6. A clear solution was obtained.

Example 3

Evaluation of Organophosphates

The organophosphate samples obtained from Examples 1 and 2, and commercial organophosphates were evaluated with ethylhexyl glycidylether grafted PAPE (EHGE-PAPE) aqueous solutions at concentrations from 17.5 to 20 percent by weight. The commercial organophosphates included Strodex™ PK-90 (phosphate coester alcohol and aliphatic ethoxylate), Dextrol™ OC-70 (phosphate ester of tridecyl alcohol ethoxylate), Dextrol™ OC-180 (neutralized potassium salt of an ethoxylated aliphatic alcohol phosphate ester), Strodex™ KM-OVOC (phosphated alcohol), Strodex™ MO-100 (phosphated alcohol), and Strodex™ EHK-70 (phosphated alcohol), which were obtained from Ashland Inc. Organophosphates were evaluated at concentrations of about 8-18 wt % actives and at a pH of about 7. EHGE-PAPE aqueous solutions gel at ambient temperature. The results are set forth in Tables 2, 3 and 4.

TABLE 2

Evaluation of Organophosphates

| Organophosphate | EHGE-PAPE (g) | OP active % | Water (g) | Solution Viscosity* | Appearance | pH |
|---|---|---|---|---|---|---|
| Strodex ™ PK-90 | 17.50 | 14.0 | 68.5 | >20K (Semi Gel) | Hazy Fluid | 7.91 |
| Dextrol ™ OC-180 | 17.50 | | 68.5 | Gel | Doesn't Flow | 7.00 |
| Strodex ™ KM-OVOC | 17.50 | 14.0 | 68.5 | 8,098 | Hazy Fluid | 7.28 |
| Sample 1 | 17.50 | 14.0 | 68.5 | 9,498 | Clear Fluid | 7.13 |
| Sample 2 | 17.50 | 14.0 | 68.5 | 8,148 | Clear Fluid | 6.96 |

EHGE—ethylhexylglycol ether
OP—organophosphate
*Brookfield (Spindle 3 @ 12 rpm, 25° C.)

TABLE 3

Organophosphates Impact on Clarity and Viscosity

| Organophosphate | EHGE-PAPE (g) | Organophosphate Active % | Water (g) | Solution BFV after pH adjustment to 7, cps | Solution Clarity |
|---|---|---|---|---|---|
| Strodex ™ MO-100 | 17.5 | 10 | 72.5 | 6200 | Opaque, brown |
| Strodex ™ EHK-70 | 17.5 | 10 | 72.5 | 670 | Opaque, white |
| Sample 4 | 17.5 | 10 | 72.5 | 1920 | Clear |

Test data demonstrate that hydrophobic organophosphate obtained from reaction with low carbon chain alcohols ($C_6$-$C_{20}$) are the most effective in suppressing the viscosity of 17.5% EHGE-PAPE solutions at pH≈7. Tridecylethoxylate phosphate was found to be ineffective and 2-ethylhexyl phosphate was found to be the most effective at 10% active. The 2-ethylhexyl phosphate is significantly more effective than isooctyl phosphate, with viscosities of 679 cps versus 6200 cps, respectively, although both are effective. Phosphate co-esters, made from reacting tetraphosphorus decaoxide ($P_4O_{10}$) simultaneously with two different alcohols, were also found to be effective in suppressing EHGE-PAPE solution viscosities with improved appearance (e.g. clear) due to decreased hydrophobicity.

Table 4 illustrates that the ratio and level of ethoxylation of the alcohol are important in optimizing viscosity suppressing efficiencies. It was found that the greater the degree of ethoxylation of the ethoxylated alcohol, the higher the sto- Table 4 also shows the impact of the hydrophobe. The 2-ethylhexanol based phosphate and phosphate coesters (using the same hydrophobe present in the EHGE-PAPE) are the most efficient hydrophobes evaluated for viscosity control and reduction. The similar branched isooctyl alcohol is also effective but less efficient than 2-ethylhexanol based phosphate coesters. The linear octyl alcohol is the least effective from a structural view point and the most divergent from the 2-ethylhexyl alcohol based on structure.

Also as shown in Table 4, coesters were unexpectedly found to be more efficient than blends of two different organophosphates using respective independent hydrophobes to suppress the solution viscosity of HM-PAPEs.

Additionally, as noted earlier, organophosphates can be converted leaving near zero residual alcohols and VOC controlled at well below <0.5%. The EDA-6 nonionic surfactant as well as other low molecular weight nonionics surfactants has a VOC>8%.

TABLE 4

Impact of Hydrophobes

| Organophosphate | HM-PAPE wt % | OP Active, wt % | Water wt % | BF Viscosity, cps | HM-PAPE Solution |
|---|---|---|---|---|---|
| Strodex ™ EHK-70 | 17.63 | 9.5 | 72.93 | 850 | Cloudy |
| Novel ® 23E7 Ethoxylate* (C12-C13 7EO nonionic) | 17.5 | 16 | 66.5 | 15300 | |
| Carbowet ® 144** (Ethoxylated alkylphenol nonionic HLB: 14.4) | 17.5 | 14 | 68.5 | >20000 | |
| EDA-6 (nonionic surfactant) | 17.5 | 14 | 68.5 | 3580 | |
| Sample 3 | 17.5 | 8 | 74.5 | 7730 | Clear |
| Sample 3 | 17.5 | 10 | 72.5 | 4500 | Clear |
| Sample 3 | 17.5 | 12 | 70.5 | 2750 | Clear |
| Sample 3 | 20 | 14 | 66 | 5300 | Clear |
| Sample 3 | 20 | 16 | 64 | 6000 | Clear |
| Sample 3 | 20 | 18 | 62 | 7300 | Clear |
| Sample 2 | 17.5 | 8 | 74.5 | 6300 | Slight Haze |
| Sample 2 | 17.5 | 10 | 72.5 | 3000 | Slight Haze |
| Sample 2 | 17.5 | 12 | 70.5 | 2320 | Slight Haze |
| Sample 2 | 20 | 14 | 66 | 4100 | Slight Haze |
| Sample 2 | 20 | 16 | 64 | 3800 | Slight Haze |
| Sample 2 | 20 | 18 | 62 | 5850 | Slight Haze |
| Sample 4 | 17.5 | 8 | 74.5 | 11750 | Slight Haze |
| Sample 4 | 17.5 | 10 | 72.5 | 6150 | Slight Haze |
| Sample 4 | 17.5 | 12 | 70.5 | 4700 | Slight Haze |
| Sample 5 | 17.5 | 8 | 74.5 | 3370 | Clear |
| Sample 5 | 17.5 | 10 | 72.5 | 2050 | Clear |
| Sample 5 | 17.5 | 12 | 70.5 | 1490 | Clear |
| 44% Dextrol ™ OC-180/56% Strodex ™ KM-0VOC | 17.5 | 8.2 | 74.35 | >20000 | |
| 46% Dextrol ™ OC-180T/53.4% Strodex ™ KM-0VOC | 17.5 | 12.35 | 70.2 | >20000 | Cloudy |
| 43.3% Dextrol ™ OC-70/ 56% Strodex ™ KM-0VOC | 17.5 | 12.35 | 70.2 | >20000 | Clear |
| Strodex ™ PK-90 | 17.5 | 8 | 74.5 | >20000 | Viscous |

EDA-6—Ethoxylateddecylalcohol with an average of 6 moles of ethylene oxide
*Available from Sasol in North America
**Available from Air Products and Chemicals, Inc.

ichiometry of the alcohol to ethoxylated alcohol required. For example, but not by way of limitation, a stoichiometric ratio of 6:1 isooctyl alcohol to TDA-9 (tri-decyl alcohol adducted with an average of 9 moles of ethylene oxide) was most efficient within the series, but a lower ratio of 4:1 was required using isooctyl alcohol in combination with more hydrophobic TDA-6 (tridecyl alcohol adducted with an average of 6 moles of ethylene oxide).

The presently disclosed and claimed invention provides organophosphates including mono-, di- and co-substituted organophosphates, and mixtures thereof facilitate providing concentrated solutions of NSATS in low VOC and no-VOC coatings with lower costs than potential alternatives.

It is, of course, not possible to describe every conceivable combination of the components or methodologies for purpose of describing the disclosed information, but one of ordinary skill in the art can recognize that many further combinations and permutations of the disclosed information are possible. Accordingly, the disclosed information is intended to embrace all such alternations, modifications and variations that fall within the spirit and scope of the appended claims.

What is claimed is:

1. An associative thickener composition comprising:
   1) a water dispersible polymer modified with a first hydrophobic group; and
   2) a low VOC organophosphate represented by one or both of the following formulas:

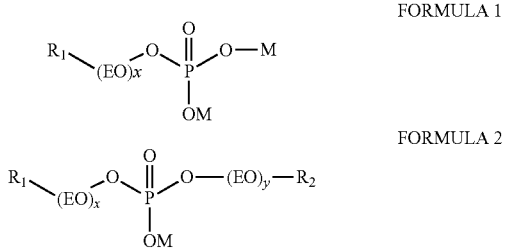

FORMULA 1

FORMULA 2 wherein M represents a counter cation, x and y are 0-12, $R_1$ is chosen as the same as said first hydrophobic group, and $R_2$ is selected from the group consisting of said first hydrophobic group and a second hydrophobic group with 19 or less carbon atoms, and
wherein the water dispersible polymer modified with said first hydrophobic group is selected from the group consisting of hydrophobically modified ethylene oxide urethane (HEUR) block copolymers, aminated HEURs, hydrophobically modified polyacetal polyethers (HM-PAPEs), hydrophobically modified aminoplast polyethers, hydrophobically modified polyacrylates and polymethacrylates (HM-PA and HM-PMA), hydrophobically modified polysaccharides, and combinations thereof, and
wherein an aqueous solution or dispersion of said associative thickener composition has a lower viscosity than an aqueous solution or dispersion of said water dispersible polymer without said low VOC organophosphate.

2. The associative thickener composition of claim 1, wherein said first hydrophobic group is a $C_8$-$C_{19}$ alkyl.

3. The associative thickener composition of claim 2, wherein said first hydrophobic group is a branched alkyl.

4. The associative thickener composition of claim 3, wherein said first hydrophobic group is ethylhexyl.

5. The associative thickener composition of claim 1, wherein said first hydrophobic group is a hydrophobic moiety selected from the group consisting of linear alkyl, branched alkyl, alkenyl, alkylaryl, arylalkyl, arylalkenyl, cycloaliphatic polycyclic, and combinations thereof.

6. The associative thickener composition of claim 1, wherein said first hydrophobic group is a $C_5$-$C_{19}$ alkyl and at least one of $R_1$ and $R_2$ is a $C_5$-$C_{19}$ alkyl.

7. The associative thickener composition of claim 6, wherein said first hydrophobic group is a branched alkyl and at least one of $R_1$ and $R_2$ is a branched alkyl.

8. The associative thickener composition of claim 7, wherein said first hydrophobic group is ethylhexyl.

9. The associative thickener composition of claim 6, wherein $R_2$ is an alkyl group having more carbon atoms than $R_1$ and y is greater than x.

10. The associative thickener composition of claim 9, wherein y is greater than or equal to 6.

11. The associative thickener composition of claim 10, wherein $R_2$ is tridecyl.

12. The associative thickener composition of claim 6, wherein said organophosphate is a co-ester.

13. The associative thickener composition of claim 12, wherein $R_1$ is isooctyl and $R_2$ is tridecyl.

14. The associative thickener composition of claim 12, wherein $R_1$ is $C_5$-$C_{10}$ alkyl, x equals to 1, $R_2$ is an alkyl group having at least 11 carbon atoms, and y is greater than 1.

* * * * *